(12) United States Patent
Lee

(10) Patent No.: US 9,323,360 B2
(45) Date of Patent: Apr. 26, 2016

(54) METHOD AND DEVICE FOR DETECTING TOUCH INPUT

(76) Inventor: Sung Ho Lee, Hwaseong-si (KR)

(*) Notice: Subject to any disclaimer, the term of this patent is extended or adjusted under 35 U.S.C. 154(b) by 294 days.

(21) Appl. No.: 13/391,288

(22) PCT Filed: Aug. 20, 2010

(86) PCT No.: PCT/KR2010/005516
§ 371 (c)(1),
(2), (4) Date: Feb. 19, 2012

(87) PCT Pub. No.: WO2011/021877
PCT Pub. Date: Feb. 24, 2011

(65) Prior Publication Data
US 2012/0146930 A1    Jun. 14, 2012

(30) Foreign Application Priority Data
Aug. 21, 2009  (KR) .................. 10-2009-0077574

(51) Int. Cl.
*G06F 3/041* (2006.01)
*G06F 3/0488* (2013.01)
*G02F 1/1333* (2006.01)

(52) U.S. Cl.
CPC ............ *G06F 3/041* (2013.01); *G06F 3/04883* (2013.01); *G02F 1/13338* (2013.01); *G06F 2203/04104* (2013.01); *G06F 2203/04806* (2013.01); *G06F 2203/04808* (2013.01)

(58) Field of Classification Search
CPC ......... G06F 3/044; H03K 17/962; G01D 5/24
See application file for complete search history.

(56) References Cited

U.S. PATENT DOCUMENTS

| 2007/0030255 A1* | 2/2007 | Pak ......................... G06F 3/044 345/173 |
| 2008/0007529 A1* | 1/2008 | Paun .................. H03K 17/9622 345/168 |
| 2009/0066663 A1* | 3/2009 | Chang et al. .................. 345/173 |

(Continued)

FOREIGN PATENT DOCUMENTS

| CN | 101464750 | 6/2009 |
| JP | 10-154042 | 6/1998 |

(Continued)

OTHER PUBLICATIONS

International Search Report of International Application No. PCT/KR2010/005516 dated Apr. 28, 2011.

*Primary Examiner* — Seokyun Moon
*Assistant Examiner* — Peijie Shen

(57) ABSTRACT

Provided is a touch input detection method that detects a contact or approach of a touch input means (90) such as a finger of a human body, an electric conductor or a touch pen on a touch panel (10) and produces an input signal. The touch input detection method includes the steps of: (a) detecting a first touch input; (b) calculating an area where the first touch input has been detected; (c) detecting a second touch input that occurs at a predetermined time interval after occurrence of the first touch input; (d) calculating an area where the second touch input has been detected; and (e) judging a change in the areas from the first touch input to the second touch input to thus produce a zooming signal. Accordingly, a zooming signal is produced according to a change in an area of a touch input, to thus implement a zoom gesture very simply, to also realize the zoom gesture with only one finger, and to thereby achieve a touch input operation compactly.

14 Claims, 12 Drawing Sheets

(56) References Cited

U.S. PATENT DOCUMENTS

2009/0102804 A1* 4/2009 Wong et al. .................... 345/173
2010/0045631 A1* 2/2010 Chen et al. .................... 345/174
2010/0302176 A1* 12/2010 Nikula et al. ................. 345/173

FOREIGN PATENT DOCUMENTS

| JP | 2008-065504 | 3/2008 |
| KR | 10-2008-0068782 A | 7/2008 |
| KR | 10-2009-0007865 A | 1/2009 |

* cited by examiner

S1=tc*9

S2=tc*15

METHOD AND DEVICE FOR DETECTING TOUCH INPUT

TECHNICAL FIELD

The present invention relates to a touch input detection method and device, and more particularly, to a touch input detection method and device that detects touch inputs, calculates an area of a region where the touch input has occurred, judges a change of the area according to lapse of time and produces a zooming signal.

BACKGROUND ART

Usually, a touch input device is an input device attached onto or incorporated in a display device such as LCD (Liquid Crystal Display), PDP (Plasma Display Panel), OLED (Organic Light Emitting Diode), and AMOLED (Active Matrix Organic Light Emitting Diode) and detects a touch signal corresponding to a touch point as an input signal when an object such as a finger or pen contacts the touch input device. The touch input device is very widely used for mobile devices such as mobile phones, PDA (Personal Digital Assistant), and PDP (Portable Multimedia Player). Besides, the touch input device is also applied to a large-sized video display device such as monitors and TVs.

The touch input device generates an input signal corresponding to a coordinate of a touch point when a touch input occurs at least one selectable area among a plurality of selectable areas that are usually displayed as graphic images on a touch panel. For example, if graphic images such as icons or keypads provided on a screen of a display device are touched, input signals that correspond to the selected icons or keypads are generated.

As described above, in the case that graphic images such as icons or keypads are displayed on a screen, background images overlap with the graphic images such as icons or keypads for touch inputs. As a result, the background images may deteriorate. In addition, there is a problem that touch inputs may become complicated since graphic images such as icons or keypads for touch inputs should be activated.

For example, a method of detecting a zoom gesture in a conventional touch panel includes the steps of activating icons for inputting the zoom gesture, touching a corresponding icon, and generating a zoom-in or zoom-out signal in correspondence to the input icon. In addition, when a zoom gesture is ended, a user should close icons for the zoom gesture again. This zoom gesture realization method has problems that background images overlap with the graphic images such as icons or keypads for touch inputs as described above, GUI (Graphical User Interface) for a zoom gesture should be provided separately, and user's touch inputs become complicated.

In addition, a conventional zoom gesture detection method has a problem that it is difficult to select an area to be expanded or reduced on a screen. In most cases, an area to be expanded or reduced on a screen should be selected, or cannot be selected in advance, prior to starting a zoom gesture.

DISCLOSURE

Technical Problem

In order to solve the above-mentioned problems of conventional art, it is an object of the present invention to provide a touch input detection method and device that detects that an area where a touch input has occurred changes according to lapse of time, to thus detect a zoom gesture, and to thereby simplify a structure of a screen, have no need to separately provide a graphical user interface (GUI) for a zoom gesture, designate an area to be expanded or reduced very conveniently, and make it convenient for a user to perform a touch input.

Technical Solution

To attain the above object of the present invention, according to an aspect of the present invention, there is provided a touch input detection method that detects a contact or approach of a touch input means (90) such as a finger of a human body, an electric conductor or a touch pen on a touch panel (10) and produces an input signal, the touch input detection method comprising the steps of:

(a) detecting a first touch input;
(b) calculating an area where the first touch input has been detected;
(c) detecting a second touch input that occurs at a predetermined time interval after occurrence of the first touch input;
(d) calculating an area where the second touch input has been detected; and
(e) judging a change in the areas from the first touch input to the second touch input to thus produce a zooming signal.

Preferably but not necessarily, at the step (e), a zoom-in signal is produced when the area of the second touch input increases in comparison with that of the first touch input, and a zoom-out signal is produced when the area of the second touch input decreases in comparison with that of the first touch input.

Preferably but not necessarily, at the step (e), a zoom-out signal is produced when the area of the second touch input increases in comparison with that of the first touch input, and a zoom-in signal is produced when the area of the second touch input decreases in comparison with that of the first touch input.

Preferably but not necessarily, at the step (e), a change in the areas from the first touch input to the second touch input is judged in the case that the first touch input and the second touch input continuously occur to thereby produce a zooming signal.

Preferably but not necessarily, at the step (e), a change in the areas from the first touch input to the second touch input is judged in the case that the first touch input and the second touch input intermittently occur to thereby produce a zooming signal.

Preferably but not necessarily, at the step (e), a zooming signal that magnifies or reduces a screen on the basis of a central point of the area where the first touch input has occurred is produced.

Preferably but not necessarily, the touch panel (10) is a touch panel (10) where a plurality of touch cells (60) that detect a touch input individually are arranged in a matrix form, and calculation of the areas at the steps (b) and (d) is achieved by adding the number of the touch cells (60) where the touch inputs have been detected.

Preferably but not necessarily, the touch panel (10) is a touch panel (10) where a plurality of touch cells (60) that detect a touch input individually are arranged in a matrix form, and calculation of the areas at the steps (b) and (d) is achieved by detecting magnitude of an electrostatic capacity of the touch cells (60) where the touch inputs have been detected.

To attain the above object of the present invention, according to another aspect of the present invention, there is provided a touch input detection device that detects a contact or approach of a touch input means (90) such as a finger of a human body, an electric conductor or a touch pen on a touch panel (10) and produces an input signal, the touch input detection device comprising:

a touch input detector (70) that detects a touch input when the touch input occurs on the touch panel (10);

an area calculator (80) that calculates an area of a corresponding touch input region at a point in place where the touch input has been detected when the touch input detector has detected the touch input; and a zooming signal generator (85) that judges a change in the area of the touch input that has been calculated in the area calculator (80) according to lapse of time.

Preferably but not necessarily, the zooming signal generator (85) produces a zoom-in signal when the area of the touch input region increases according to lapse of time, and produces a zoom-out signal when the area of the touch input region decreases according to lapse of time.

Preferably but not necessarily, the zooming signal generator (85) produces a zoom-out signal when the area of the touch input region increases according to lapse of time, and produces a zoom-in signal when the area of the touch input region decreases according to lapse of time.

Preferably but not necessarily, the touch panel (10) is installed in the upper portion of a display device.

Preferably but not necessarily, the touch panel (10) is installed in a display device as any one substrate of substrates that are included in the display device.

Preferably but not necessarily, the touch panel (10) is a touch panel (10) where a plurality of touch cells (60) are arranged in a matrix form, and the area calculator (80) calculates the area of the touch input region by adding the number of the touch cells (60) where the touch inputs have been detected.

Preferably but not necessarily, the touch panel (10) is a touch panel (10) where a plurality of touch cells (60) are arranged in a matrix form, wherein each touch cell (60) comprises at least one 3-terminal type switching element (40) for switching a position detection signal and a conductive pad (50) that is connected to any one terminal of the 3-terminal type switching element (40), and wherein the touch input detector (70) detects a signal that is generated due to charging and discharging of a virtual capacitor that is formed between the touch input means (90) and the conductive pad (50) to thus detect a touch input.

Preferably but not necessarily, the area calculator (80) detects magnitude of an electrostatic capacity of the touch cell (60) where the touch input has been detected to thus calculate an area of the touch input region.

Advantageous Effects

As described above, the touch input detection method and device according to this invention, compares an area of a first touch input with that of a second touch input that occurs with a time difference with respect to the first touch input, and produces a zoom-in signal and a zoom-out signal according to an increase in the areas of the second touch input in comparison with the first touch input, and a decrease therein, to thereby implement a zoom gesture by a simple operation that a user makes his or her one finger touched on a touch panel and lifted up and down on the touch panel, has no need to separately provide a graphical user interface (GUI) for a zoom gesture to thereby simplify an algorithm for detection of touch inputs and to thus simplify a structure of a screen, magnifies or reduces a screen on the basis of the area where the first touch input has occurred, to thereby designate an area to be expanded or reduced very conveniently, and makes it convenient for a user to perform a touch input.

DESCRIPTION OF DRAWINGS

The above and other objects and advantages of the invention will become more apparent by describing the preferred embodiments with reference to the accompanying drawings in which.

BEST MODE

Figure 1:
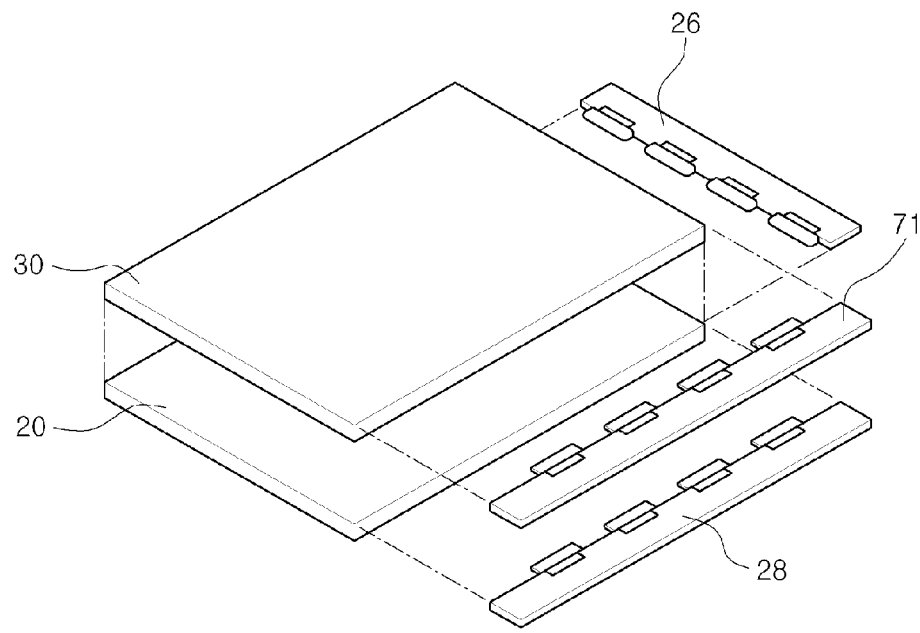
FIG. 1 is a disassembled perspective view showing an example of a structure of a display device.

Hereinbelow, a touch input detection method and device according to preferred embodiments of the present invention will be described with reference to the accompanying drawings.

First, the present invention relates to a touch input detection device that detects a contact or approach of a touch input means 90 such as a finger of a human body, an electric conductor or a touch pen that contacts the human body, on a touch panel and produces an input signal. In particular, the present invention relates to a touch input detection device that detects a zoom gesture. The touch input detection device is attached onto or incorporated in a display device such as LCD (Liquid Crystal Display), PDP (Plasma Display Panel), OLED (Organic Light Emitting Diode), and AMOLED (Active Matrix Organic Light Emitting Diode), or is installed in a display device as any one substrate of substrates that are included in the display device.

The touch input detection method and device according to the present invention can be implemented in various types of touch panels such as a resistance type touch panel that detects a touch point as a change in a resistance value, an optical type touch panel that detects a touch point optically, a pressure type touch panel that detects a pressure type touch input, a capacitive type touch panel that detects a soft contact or approach of a human body or an electronic pen in an electrostatic capacitive mode.

To help comprehension of this invention, the composition of a touch panel in which a plurality of touch cells that detect a touch input individually are arranged will be described below. The composition of the touch panel that is described below is nothing but an embodiment. The technological idea of the present invention can be applied in the above-described different types of touch panels.

Touch cells each formed of a 3-terminal type switching element such as a TFT (Thin Film Transistor) and a conductive pad are formed on a single substrate, in the case of a touch panel that will be described below. Accordingly, the touch panel detects a charge accumulated in a virtual capacitor formed between a touch input means and the conductive pad in various forms and acquires a touch signal, when the touch input means such as a part of the human body such as a finger, an iron pen, an electronic pen that generates a predetermined electrical signal, or the like approaches the conductive pad in a non-contact manner.

As an embodiment of the present invention, a switching element is turned on/off by virtual capacitor which is formed between the touch input means and the conductive pad to thus acquire a touch signal. Although it will not be referred to as an embodiment of the present invention, an on/off control signal for turning on/off the switching element is separately applied to the switching element, to thus detect a charge that has been accumulated in the virtual capacitor which is formed between the touch input means and the conductive pad and acquire a touch signal. In addition, when an electronic pen that generates a predetermined electrical signal approaches to a conductive pad, it will be detected whether the virtual capacitor is charged or discharged, to thus acquire a touch signal.

In the following drawings, thickness or areas have been enlarged to definitely show several layers and areas. Through the whole detailed description of the specification, like reference numerals are used for like elements. When it is mentioned that a portion such as a layer, an area and a substrate is placed "on" or "on the upper surface" of another portion, this means that the portion is not only placed "justly on" the other portion but also the former is placed on a third portion between the former and the latter. In contrary, when it is mentioned that a certain portion is placed "justly on" another portion, this means that there are no other portions between them.

In addition, in the following embodiments, switching elements can be explained as being replaced with "TFTs." Accordingly, identical reference numerals are used for the switching elements and TFTs.

A "zooming signal" that will be described below designates a signal that magnifies or reduces an image. For example, a "zoom-in" signal is a signal that magnifies an image and a "zoom-out" signal is a signal that reduces an image.

FIG. 1 shows an example in which a touch panel is installed as an upper substrate of a display device. Referring to FIG. 1, the display device includes two substrates largely like a general display device. In the case of a LCD (Liquid Crystal Display), a lower substrate 20 is a TFT (Thin Film Transistor) substrate on the upper surface of which pixels and pixel electrodes are arranged, TFTs are respectively arranged in a unit pixel, and gate lines and data lines are arranged. An upper substrate 30 is a color filter substrate on which color filters are printed. A liquid crystal layer in which liquid crystal is sealed is formed between the lower substrate 20 and the upper substrate 30. In the case of an AMOLED (Active Matrix Organic Light Emitting Diode), a lower substrate 20 is a TFT substrate that is formed similarly to the LCD, and an upper substrate 30 is a sealed substrate for sealing organic matters. The lower substrate 20 and the upper substrate 30 are formed of a light transmittance material such as glass, plastic or film. The lower substrate 20 and the upper substrate 30 can be formed of a substrate having a multi-layer structure that is not a single layer substrate. For example, the upper substrate 30 can be configured by mounting touch components including touch cells 60 on a film, and laminating this film with a glass or plastic substrate.

As illustrated, a gate integrated circuit (IC) 26 and a source integrated circuit (IC) 28 are mounted at an edge portion of the lower substrate 20. The gate IC 26 applies a gate signal to a TFT that is installed in each unit pixel, and the source IC 28 applies a data signal to each TFT. The gate IC 26 and the source IC 28 are drive ICs for controlling signals for display, respectively, and are mounted at the edge portion of the lower substrate 20 in the form of COF (Chip On Film) or COG (Chip On Glass).

Here, a plurality of signal lines are arranged in order to detect the touch inputs. A touch signal drive integrated circuit (IC) 71 is further installed in order to control these signal lines. As illustrated, the touch signal drive IC 71 is mounted at the edge portion of the upper substrate 30 or the lower substrate 20 in the form of COF (Chip On Film) or COG (Chip On Glass).

Figure 2:
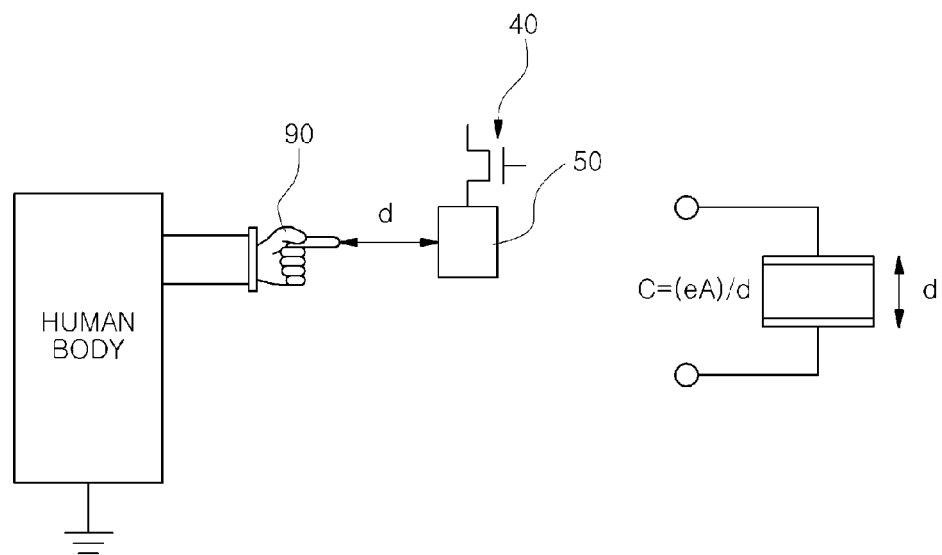
FIG. 2 is a diagram for conceptually explaining an electrostatic capacity formation example between the human body and a conductive pad.

FIG. 2 shows a principle of detecting a non-contact touch input (with respect to a conductive pad to be described later) conceptually. The touch input means 90 is a bodily finger in FIG. 2. Of course, the touch input means 90 may be formed of other conductors that have electrical characteristics similar to the bodily finger. Referring to FIG. 2, assuming that a distance between the finger and the conductive pad 50 is an interval "d" and corresponds to an area "A", when a finger approaches to the conductive pad 50, an electrostatic capacity "C" is formed between the finger and the conductive pad 50 as shown in a right side equivalent circuit of FIG. 2 and a formula, that is, C=(eA)/d. In this case, the earth acts as a virtual ground with respect to the human body. Therefore, charges can be accumulated in the electrostatic capacity "C" formed between the finger and the conductive pad 50 if voltage is applied to the conductive pad 50. Hereinbelow, the electrostatic capacity "C" is expressed as the virtual capacitor. As an embodiment, when the human body contacts the conductive pad 50, the electrostatic capacity of 10-20 pF is formed. When the human body approaches to the conductive pad 50 at a non-contact state, the electrostatic capacity of 2-5 pF can be formed according to permittivity "e" of an object between the human body and the conductive pad 50.

Figure 3:
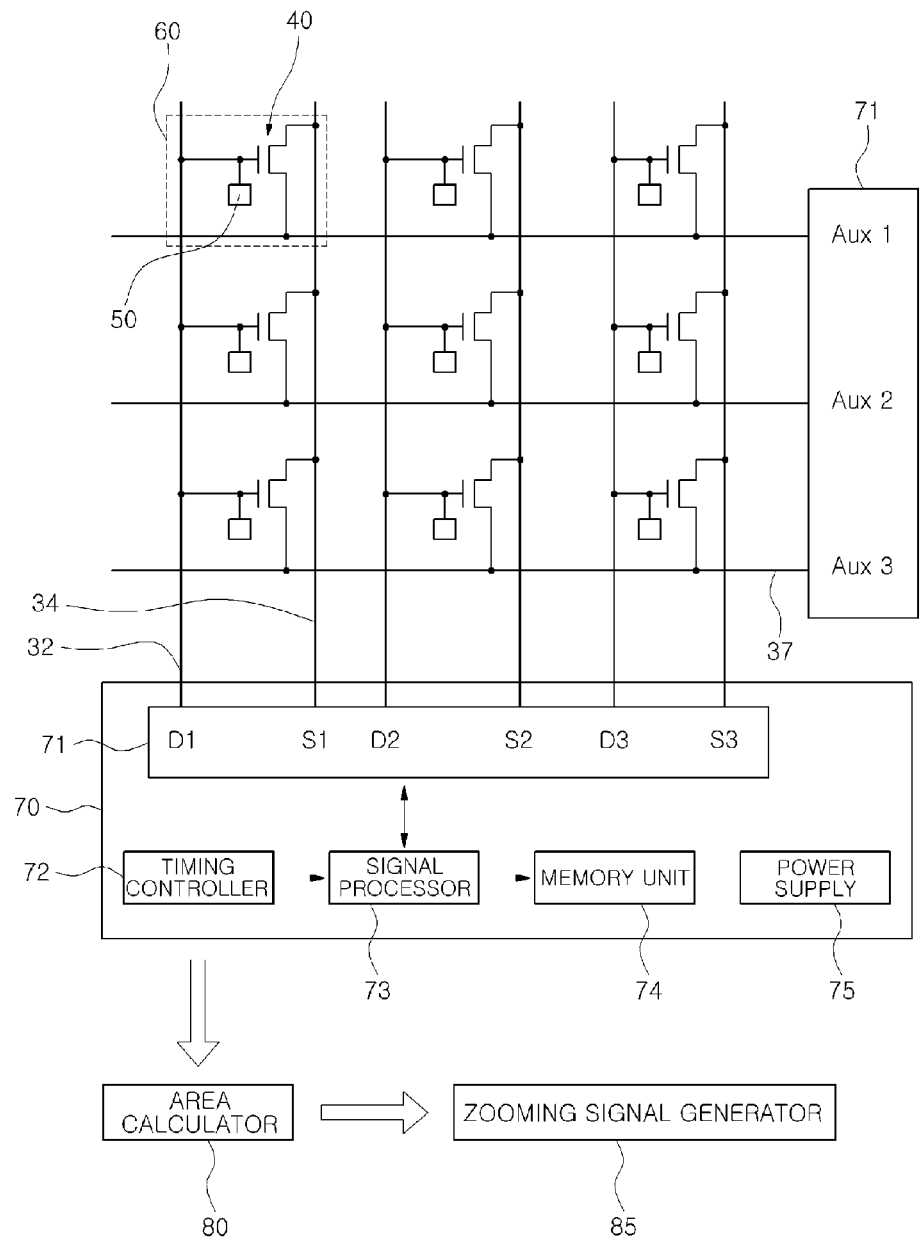
FIG. 3 is a configurational diagram showing an embodiment of a touch input detection device according to the present invention.

FIG. 3 is a configurational diagram showing an embodiment of a touch input detection device according to the present invention.

Referring to FIG. 3, a plurality of first signal lines 32, second signal lines 34 and auxiliary signal lines 37 are arranged on the upper or lower surface of the upper substrate 30. The first signal lines 32 are lines to send position detection signals D1-D3, and the second signal lines 34 are lines to receive the position detection signals S1-S3. The auxiliary signal lines 37 are lines to apply auxiliary signals for observing position detection signals. A touch signal drive IC 71 transmits and receives the position detection signals D1-D3 and S1-S3 to and from the signal lines 32 and 34, respectively, and applies the auxiliary signals Aux1, Aux2 and Aux3 for observation to the auxiliary signal lines 37, respectively.

Figure 4:
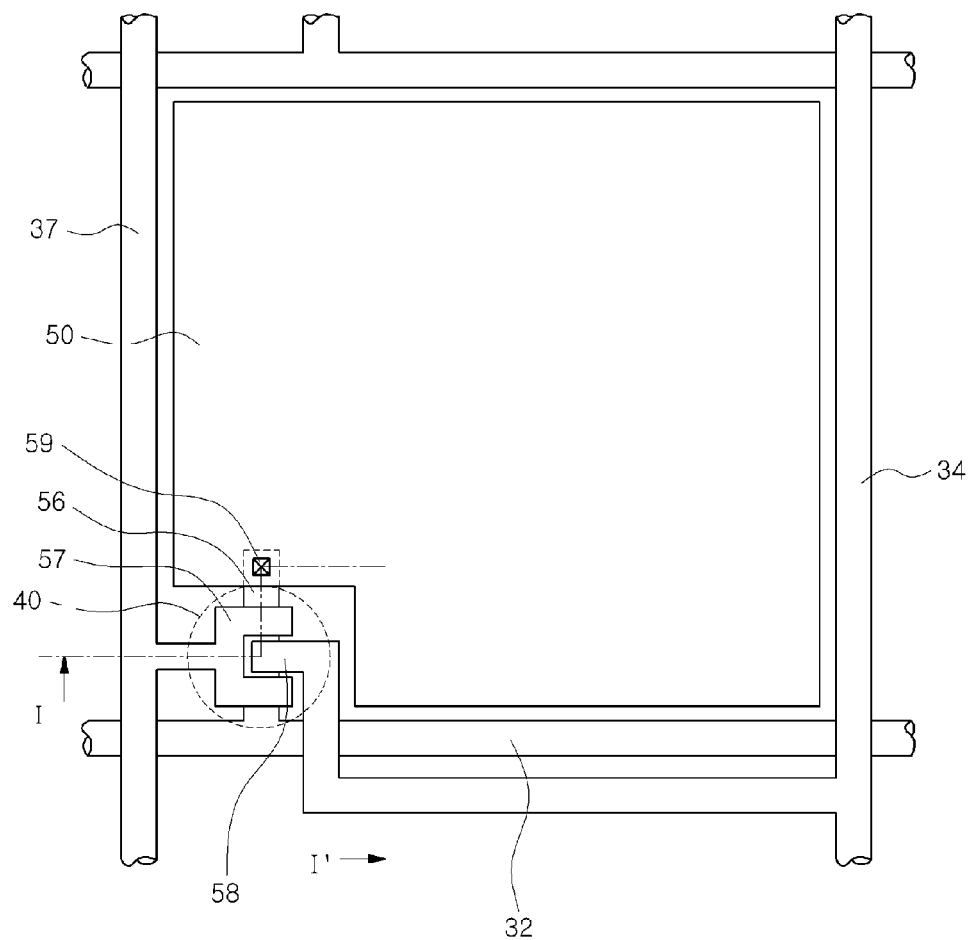
FIG. 4 is a plan view showing a configurational example of a unit touch cell in the FIG. 3 embodiment.

FIG. 4 is a plan view showing a configurational example of unit touch cells 60. Referring to FIG. 4, the unit touch cells 60 each includes a 3-terminal type switching element 40 and a conductive pad 50. The 3-terminal type switching element 40 is a TFT desirably. The TFT 40 that forms a touch cell 60 is installed on the upper substrate 30, and differs from a TFT for video signal switching that is installed on the lower substrate 20. Since the touch cell 60 includes the TFT 40, it is easy to control the TFT to be turned on/off by applying a gate signal to the gate electrode of the TFT, and it is advantageous that flowing and interference of signals can be intercepted stably. In addition, signals in each touch cell 60 are divided or partitioned, using this feature, to thereby enable a multi-touch operation to be recognized. In addition, the TFT 40 is advantageous in that this component is verified in the field of LCD or AMOLED.

Referring to FIG. 4, the gate electrode of the TFT 40 is connected to the first signal line 32 in each touch cell 60, and the input electrode and the output electrode of the TFT 40 are connected to the auxiliary signal line 37 and the second signal line 34, respectively. Meanwhile, the conductive pad 50 is connected to the gate electrode of the TFT 40. Referring to FIG. 4, the gate electrode 56 of the TFT 40 withdrawn from the first signal line 32 is connected to the conductive pad 50. The source electrode 57 of the TFT 40 is connected to the auxiliary signal line 37, and the drain electrode 58 thereof is connected to the second signal line 34. Contact holes 59 of a contact process that uses ITO (Indium Tin Oxide) are used at portions where terminals, signal lines, conductive pads, etc., of a layer are mutually connected with other layers.

Here, the conductive pad 50 is formed by coating a transparent conductive material such as ITO (Indium Tin Oxide), IZO (Indium Zinc Oxide), ATO (Antimony Tin Oxide), and CNT (Carbon Nano Tube) on one surface of the upper substrate 30. The conductive pad 50 can be installed only in a local area of the touch cell 60, but as illustrated in FIG. 4, the conductive pad 50 is installed in the touch cell 60 so as to have as possible as a wide area. As the area of the conductive pad 50 becomes large, virtual capacitance formed between the touch input means 90 and the conductive pad 50 becomes large to thus acquire a touch signal stably.

Figure 5:
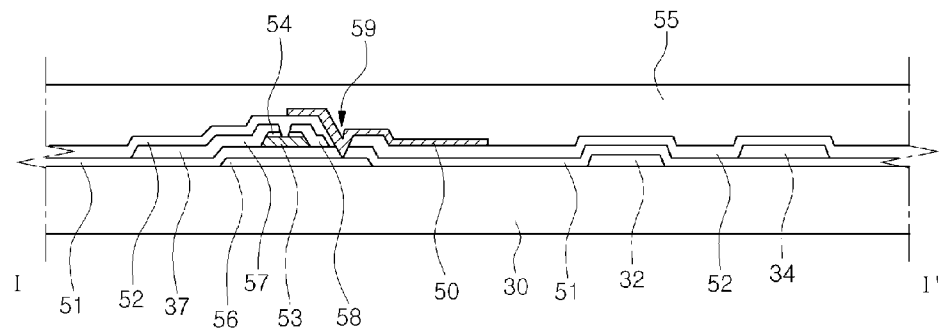
FIG. 5 is a cross-sectional view cut along a line I-I' of FIG. 4.

The cross-sectional view of FIG. 5 is a cross-section that is formed by partially cutting the plane composition of FIG. 4, and shows a layer structure in the unit touch cell 60. Although the touch components can be installed on the upper or lower surface of the upper substrate 30, the cross-sectional view of FIG. 5 shows an example that the touch components are installed on the upper surface of the upper substrate 30.

Referring to FIG. 5, the gate electrode 56 of the TFT 40 is formed on the same metal layer as that of the first signal line 32, the source electrode 57 thereof is formed on the same metal layer as that of auxiliary signal line 37, and the drain electrode 58 thereof is formed on the same metal layer as that of the second signal line 34. As illustrated, the gate electrode 56 is installed in the TFT 40. The TFT 40 includes an active layer 53 that forms a channel between the source electrode 57 and the drain electrode 58. The active layer 53 is formed to overlap the source electrode 57 and the drain electrode 58. An ohmic contact layer 54 for ohmic contact between the source electrode 57 and the drain electrode 58 is further formed on the active layer 57. The active layer 57 is formed of amorphous silicon (A-si) or poly-silicon (P-Si).

A gate insulation layer 51 is formed on the upper surface of the gate electrode 56, and a passivation layer 52 is formed on the upper surface of the source electrode 57 and the drain electrode 58, respectively. As illustrated, in order to connect the conductive pad 50 on the gate electrode 56 of the TFT 40, the contact hole 59 using ITO etc. is used.

As illustrated, in the case that the touch components are installed on the upper surface of the upper substrate 30, a transparent insulation layer 55 is coated on the upper surface of the upper substrate 30, to thereby protect the touch components. The transparent insulation layer 55 prevents the touch components from being exposed and thus damaged, and simultaneously plays a role of keeping a stabilized gap between the touch input means 90 and the conductive pad 50.

Also, use of the transparent insulation layer 55 enables a gap between the touch input means 90 and the conductive pad 50 to be kept narrow. Accordingly, a distance variable of the denominator in the formula, that is, $C=(eA)/d$ becomes small, when virtual capacitance is formed by approaching of the touch input means 90, and the virtual capacitance becomes large.

If the touch components are installed on the lower surface of the upper substrate 30, the transparent insulation layer 55 can be removed. This is because the touch components are safely protected by the upper substrate 30, and because the touch input means 90 and the conductive pad 50 can keep a stabilized gap by thickness of the upper substrate 30. In this case, there are advantages of simplifying a manufacturing process more and heightening transmissivity since no transparent insulation layer 55 is used.

Meanwhile, although not illustrated, a light shield layer to intercept light can be installed on the upper surface of the TFT 40. The light shield layer can be formed of metal used in manufacturing the source electrode 57 or drain electrode 58 of the TFT 40, metal used in manufacturing the gate electrode 56, or an impermeable insulation layer. The impermeable insulation layer can be formed of an oxide layer or nitride layer or an insulation poly-silicon layer. This light shield layer prevents the TFT 40 from reacting with the light and malfunctioning.

In addition, the light shield layer formed of the impermeable insulation layer can be formed on the upper or lower surface of the first signal lines 32, the second signal lines 34, the auxiliary signal lines 37 or the other signal lines to be described later. The light shield layer formed on the upper surface of the TFT 40 and the light shield layer formed on the upper surface of the signal lines 32, 34, and 37 are formed in an identical mask and formed all at once in a same manufacturing process. The light shield layer for the signal lines 32, 34, and 37 can solve problems of deteriorating visibility caused by reflecting light from the signal lines to thus induce a flash and deteriorating a contrast of the display device.

The passivation layer can be formed again on the upper portion of the light shield layer. The passivation layer is a nitride layer or glass (PSG) layer formed on the outside layer of the light shield layer, and is formed chiefly for the purpose of increasing a physical strength, and enhancing tolerance and insulation property for outside moisture or temperature.

The composition of the above-described touch panel is nothing but an example of explaining a touch input detection method and device according to the present invention. Although the above-described touch panel has been described with respect to the electrostatic capacity touch panel, the touch panel can be implemented into a resistance type, an optical type, a pressure type, or the other various types, so as to detect touch inputs.

Referring back to FIG. 3, the touch input detection device according to the present invention will be described. Referring to FIG. 3, it can be seen that the touch cells 60 are illustrated in a resolution of 3×3. Actually, although the touch cells 60 will be arranged in a very high resolution, a reason why that the touch cells 60 have been arranged in a resolution of 3×3 in FIG. 3 is nothing but an example that is illustrated to help understanding the invention.

Referring to FIG. 3, a touch input detector 70 is installed at the edge portion of one side of the upper substrate 30 or at the outside thereof. As illustrated, the touch input detector 70 includes a touch signal drive IC 71, a timing controller 72, a signal processor 73 and a memory unit 74. A touch signal that is acquired in the touch input detector 70 is delivered to an area calculator 80, and the area calculator 80 calculates an area of a region where a touch input has occurred. In addition, a zooming signal generator 85 produces a zoom-in or zoom-out signal according to a change in the calculated area of the touch input.

The touch signal drive IC 71 applies a position detection signal to the first signal lines 32, and receives the position detection signal from the second signal lines 34. In addition, the touch signal drive IC 71 can apply a gate signal and an auxiliary signal for observation even to gate signal lines 36 and auxiliary signal lines 37 to be referred in the embodiments to be described later.

The timing controller 72 generates a time sharing signal, and the signal processor 73 applies the position detection signal, the gate signal, and the auxiliary signal for observation that have been time shared to the touch signal drive IC 71 according to clock provided from the timing controller 72. The memory unit 74 is a unit for storing coordinate values of the touch cells 60 from which touch inputs are detected. An electric power supply 75 is a unit for creating high or low voltage of signals for detection of touch inputs.

The memory unit 74 is a unit for preventing a loss of the touch signals. In the case that CPU is at a "busy" state in a process of processing a lot of signals, a case that do not recognize the position detection signal can occur. Since the position detection signal that has not been already recognized cannot be reproduced, this can cause a loss of signals. The touch input detector 70 prevents the signal loss by using of the memory unit 74. For example, the touch input detector 70 temporarily stores the received position detection signals in the memory unit 74, and scans the whole position detection signals applied to the first signal lines 32, to then read out the memory unit 74 and to thereby confirm whether or not lost signals exist.

The area calculator 80 calculates an area of a region where a touch input has occurred if the touch input has been detected in the touch input detector 70. Calculation of the touch input area can be implemented by various methods. For example, an area of a region where touch inputs occur can be calculated by detecting the outermost points among points where touch inputs have been detected. However, a simpler method of calculating a touch input area is provided in this embodiment.

Preferably, the area calculator 80 adds the number of the touch cells 60 where touch inputs have been detected, to thereby calculate a touch input area. For this purpose, it is desirable for the touch input detection device to detect a multi-touch input. The multi-touch can be detected by a software program. For example, the touch input detector 70 scans the position detection signals at high speed, and interrupts the switching elements 40 for the touch cells 60 that have received the respective position detection signals when the scanning has been completed once. In this manner, the number of the touch cells 60 where the touch inputs have been detected can be confirmed if such scanning is performed several times. More preferably, the touch input detector 70 is configured to detect touch inputs for a number of points simultaneously. For this purpose, each touch cell 60 is configured to perform interruption of the position detection signal independently. The embodiment of FIGS. 6 and 7 shows a multi-touch detection example.

The zooming signal generator 85 judges a change of a touch input area that has been calculated in the area calculator 80 according to lapse of time and thus produces a zooming signal. For example, the zooming signal generator 85 produces a zoom-in signal when the area of the touch input region increases according to lapse of time, and produces a zoom-out signal when the area of the touch input region decreases according to lapse of time. Reversely, the zooming signal generator 85 may produce a zoom-out signal when the area of the touch input region increases according to lapse of time, and produce a zoom-in signal when the area of the touch input region decreases according to lapse of time.

Figure 6:
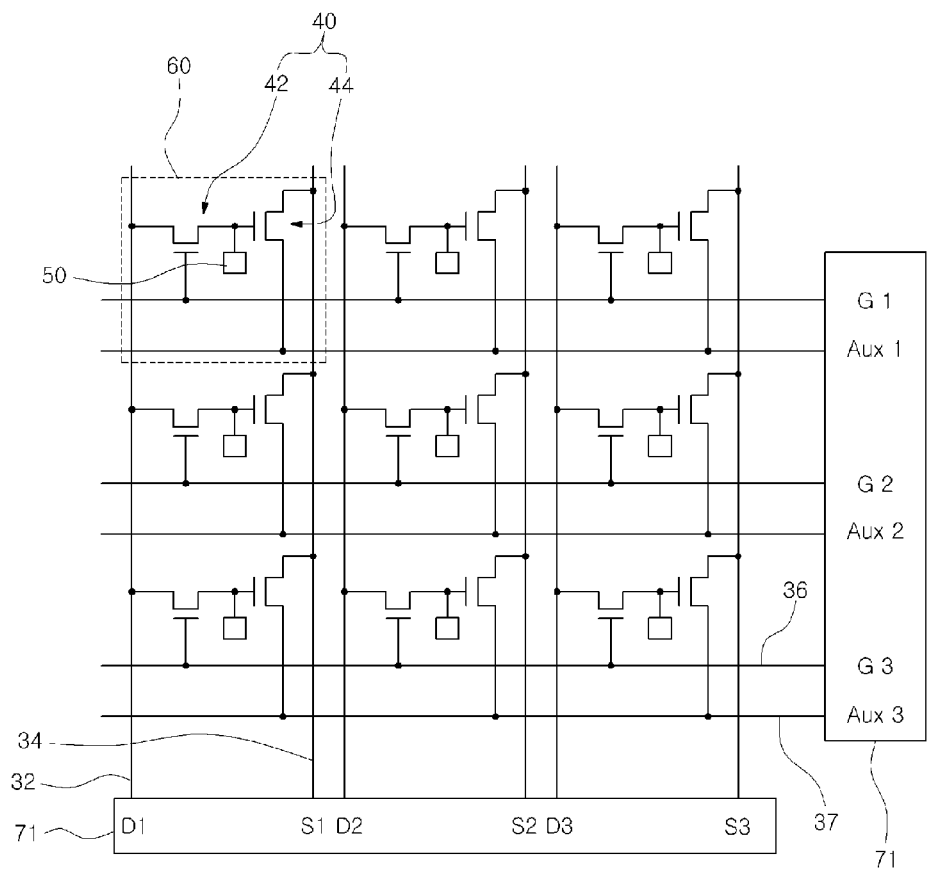
FIG. 6 is a configurational diagram showing another embodiment of a touch input detection device according to the present invention.
Figure 7:
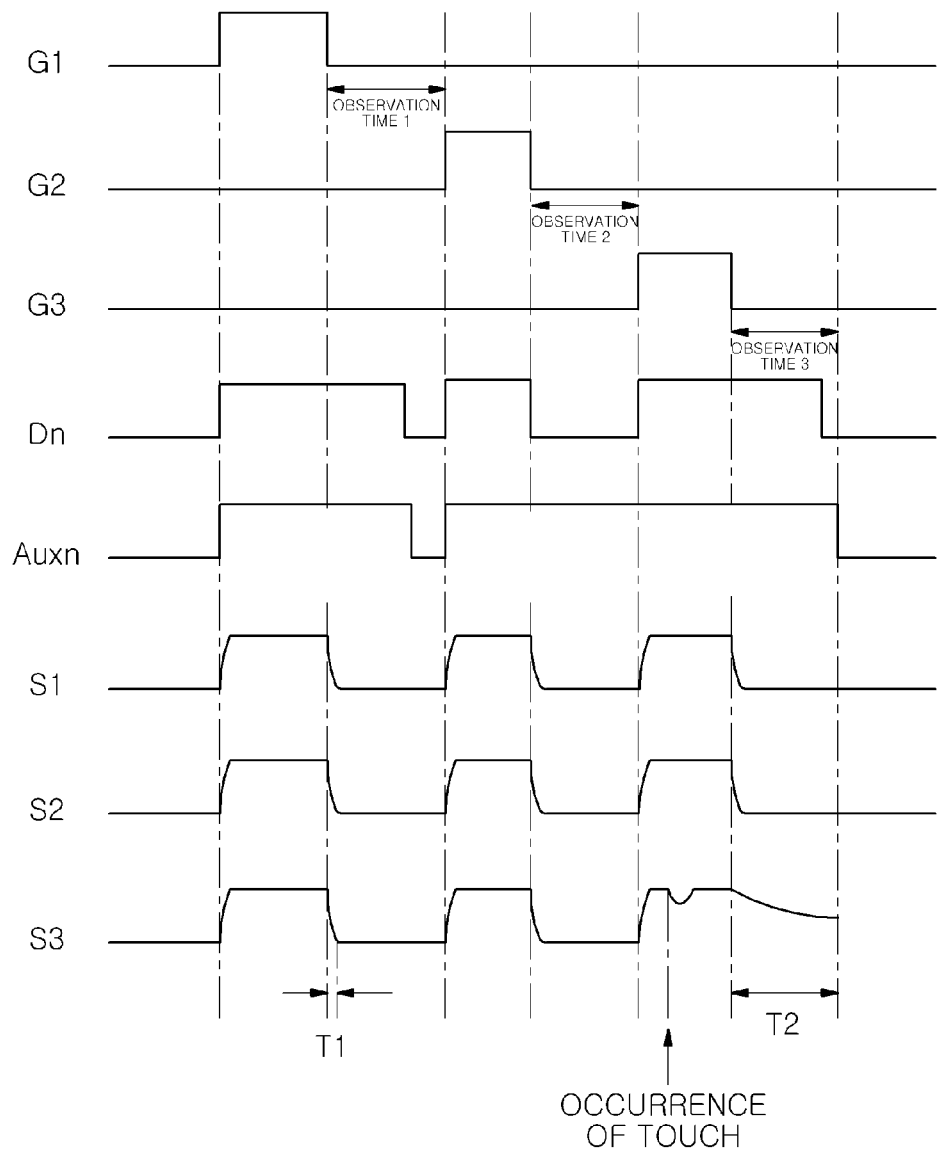
FIG. 7 is a waveform diagram showing an example of detecting touch signals in the FIG. 6 embodiment.

An embodiment of FIG. 6 shows an example of a composition of a touch panel for multi-touch detection. Referring to FIG. 6, first signal lines 32, second signal lines 34, gate signal lines 36 and auxiliary signal lines 37 are arranged on one surface of the upper substrate 30. Meanwhile, a unit touch cell 60 includes a conductive pad 50, a first TFT 42, and a second TFT 44. The input terminal of the first TFT 42 is connected to the first signal line 32 and the gate terminal thereof is connected to the gate signal line 36. The output terminal of the first TFT 42 is connected to the gate terminal of the second TFT 46. The input terminal of the second TFT 46 is connected to the auxiliary signal line 37, and the output terminal thereof is connected to the second signal line 34. Meanwhile, the conductive pad 50 is connected to the gate terminal of the second TFT 46.

In this embodiment, the touch input detector 70 applies a scan pulse to the respective gate signal lines 36 sequentially, to thus turn on the first TFT 42 sequentially. Otherwise, the touch input detector 70 turns on the gate signals Gn (n=1, 2, 3) simultaneously, to thereby induce charging with a human body, and then applies auxiliary signals to the auxiliary signal lines 37 sequentially, to thereby detect positions where touch inputs have occurred.

The above-described embodiment of FIG. 6 enables a multi-touch detection since the first TFT 42 insulates signals between the conductive pads 50.

FIG. 7 is a waveform diagram showing an example of acquiring a touch signal in the embodiment of FIG. 6. Referring to FIG. 7, the touch input detector 70 offers a scan pulse sequentially to each gate signal line 36. The gate signal Gn offered by the touch input detector 70 has a voltage level of a sufficient size so that the gate electrode of the first TFT 42 enters an active area. For example, the gate signal Gn is preferably set to be larger by 3V or higher than the position detection signal Dn that is transmitted via the first signal line 32. In case of a preferred embodiment of the present invention, the high (Hi) voltage level of the position detection signal Dn is 13V and the high (Hi) voltage level of the gate signal Gn is 18V. In addition, in order to turn off the first TFT 42 stably, the gate OFF voltage is set to be at a range of −5 to −7V.

The gate signal Gn has enough observation time between the respective signals. This is to make the virtual capacitor formed between the finger of the human body and the conductive pad 50 according to an approach of the human body, have a sufficient charging time. As illustrated, a pause period of a observation time 1 is sufficiently given between the gate signals G1 and G2. In the case that any one of the gate signals Gn is at a high state (Hi), the position detection signal Dn that is applied through the first signal line 32 is provided to keep a high state (Hi). Preferably, when one gate signal Gn is at a pause period, the position detection signal Dn also has a slight pause period.

The touch input detector 70 offers an observation voltage through the auxiliary signal lines 37. The auxiliary signal Auxn offers an observation voltage lower by 3V or more than 13V that is a voltage that is charged between the finger and the conductive pad 50 by the position detection signal Dn at a high (Hi) level. For example, it is enough that the observation voltage of the auxiliary signal Auxn is about 5V.

Referring to FIG. 7, the waveform that is obtained through the second signal lines 34 and the process of acquiring the touch signal through the waveform will be described.

If a human body does not approach although the gate signal has been applied and then the observation time has passed, as in the case that the gate signals G1 and G2 are applied, the signals Sn that are obtained through the second signal lines 34 have the waveform illustrated in FIG. 7. This is because the electrostatic capacity is not formed in the conductive pad 50 since the human body has not approached. In more detail, when the gate signal G1 is applied, the first TFT 42 is turned on. In this case, since the voltage level that is applied to the gate electrode of the second TFT 44 is higher than that is applied to the input electrode of the second TFT 44 through the auxiliary signal line 37, the second TFT 44 is also turned on. By the way, because wiring resistance and parasitic electrostatic capacity of the second signal line 44 exist, as illustrated, the obtained signals Sn have a curved line in a section ascending up to a high (Hi) level and a section descending down to a low (Lo) level, respectively. As illustrated, it is assumed that a time from the immediate time after the first TFT 42 has become turned off by the gate signal G1 and has been changed into an observation time, to the time the gate voltage of the second TFT 44 descends sharply and the obtained signal Sn descends at a low (Lo) level perfectly, is "T1." Here, a time delay that occurs in the output signals Sn in comparison with the input signals Dn in the waveform diagram of FIG. 7 has been ignored.

If a bodily approach is achieved to a right-lower touch cell 60 of FIG. 6 at a certain point in time, an electrostatic capacity will be formed between the conductive pad 50 and the bodily finger in the corresponding touch cell 60. As can be seen from the waveform of FIG. 7, if a touch occurs in a section where the gate signal G3 is at a high (Hi) level, a virtual capacitor is formed at a moment the bodily finger approaches to the conductive pad 50. Here, as the waveform of S3 is distorted at a touch occurrence point in time in the waveform diagram of FIG. 7, charge voltage can be varied at a charge beginning time. However, the S3 waveform rises up to a high (Hi) level as soon as charging is ended.

By the way, in the case that the mode of the G3 signal is changed into an observation time, that is, the G3 signal is turned off, voltage that is charged in the virtual capacitor is discharged, and the gate voltage of the second TFT 44 descends slowly. As can be seen from the S3 waveform, the output waveform of the second TFT 44 exhibits a unique output characteristic. Here, a time that is taken for the Sn waveform to fall down to 50% or below is assumed "T2."

Referring to the waveform diagram of FIG. 7, it can be seen that the times T1 and T2 have a considerable time difference therebetween. The touch input detector 70 can acquire a touch signal by reading the time that is taken for the waveform of the signal Sn that has been obtained through the second signal line 34 after the gate signal Gn has been turned off as described above to descend or descending voltage at a certain point in time. Because the signal S3 has been acquired at an observation time after the gate signal G3 has been turned off in the case of the touch signal in this example, the acquired touch signal has a coordinate value corresponding to "D3, S3."

The embodiment of FIG. 7 is one example for acquiring a touch signal. It is possible to acquire the touch signal by an alternative method that differs from the FIG. 7 embodiment. For example, according to the alternative method, after all the gate signals Gn have been turned on all at once, to thus induce the virtual capacitor formed between the human body and the conductive pad 50 to be charged, signals are sequentially applied to the auxiliary signal lines 37 to thereby observe output waveform.

Otherwise, a method of detecting electric current can be used. As one embodiment of this case, the reference voltage such as ground electric potential flows through the auxiliary signal lines 37. The touch signal drive IC 71 applies the reference voltage to the second signal lines 34, and detects magnitude of the electric current flowing when the gate signal Gn has become high and thus the second TFT 44 has been turned on, to thereby judge whether or not a touch has been input. It is obvious to one of ordinary skill in the art that the method of acquiring the touch signal can be implemented in various forms according to the technological spirit of the present invention.

The above-described embodiment of FIGS. 6 and 7 is nothing but one embodiment for detecting multi-touch, and such a method of detecting multi-touch may be implemented in various ways. In addition, the touch input detection method according to this invention requires only multi-touch detection in order to calculate an area of touch input region simpler, but does not necessarily require multi-touch detection.

Figure 8:
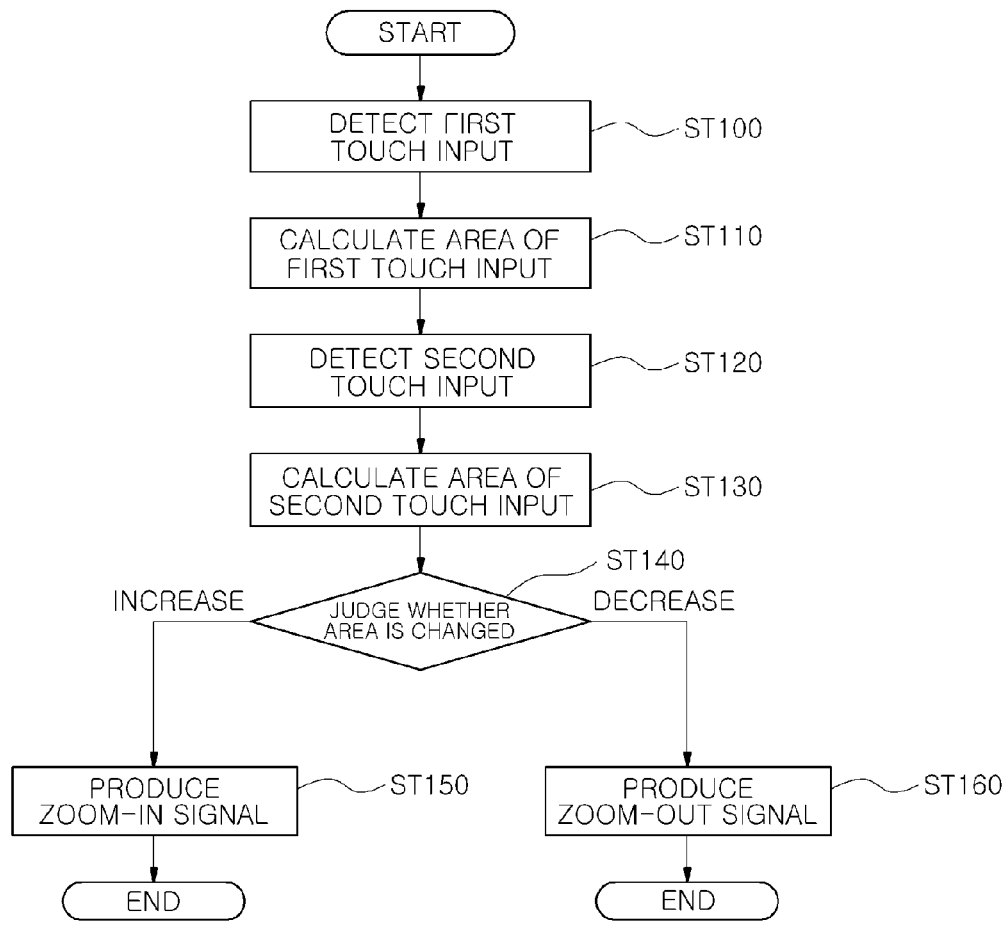
FIG. 8 is a flowchart view showing a touch input detection method according to this invention.

FIG. 8 is a flowchart view showing a touch input detection method according to this invention, and FIG. 9A through 9E show examples that a zooming control is implemented with a touch input of a finger in this invention. Referring to FIG. 8, the touch input detection method according to this invention will be described below.

The touch input detection method according to this invention produces a zooming signal based on a change in an area of a touch input according to lapse of time. Hereinafter, a touch input that occurs earlier than another with a predetermined time interval is called a "first touch input" and a touch input that occurs later than another with a predetermined time interval is called a "second touch input." The first touch input and the second touch input do not only mean two touch inputs, but also define a touch input that occurs earlier than another according to lapse of time as a first touch input and a touch input that occurs later than another according to lapse of time as a second touch input. The first and second touch inputs are defined as a relative concept of sequential touch inputs that occur according to lapse of time.

In order to make a conventional touch input detection device changed into a zoom gesture detection mode, a display device needs to be activated into a zoom gesture input mode by an input through a graphical user interface (GUI) or other buttons. The touch input detection method according to the present invention can also implement a zoom gesture by change into such a zoom gesture input mode. However, this invention can detect a zoom gesture on a display screen without making a special change of a mode. Also, a zooming control can be executed through a touch input directly on the display screen in the touch input detection method according to this invention, to thereby produce a zooming signal on the basis of a point where a touch input has occurred. This has a technological merit that a region on a screen to be magnified or reduced does not need to be designated intentionally.

Figure 9A:
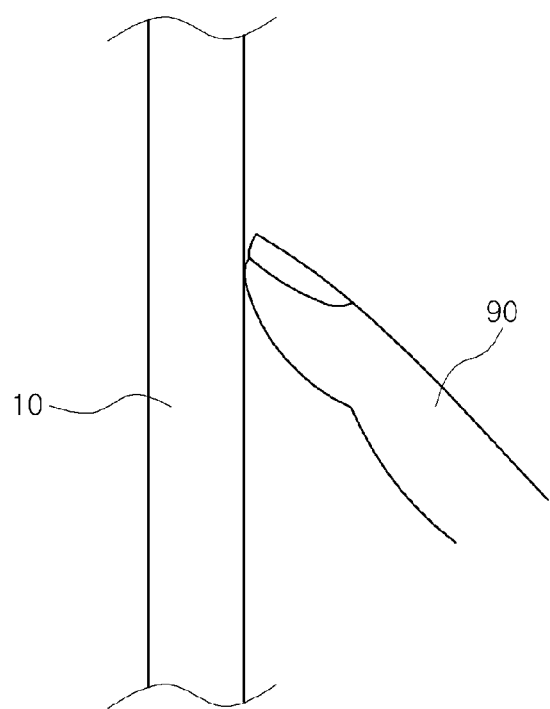
FIGS. 9A through 9E are diagrams showing an example of an example of implementing a zooming control according to this invention.
Figure 9A:
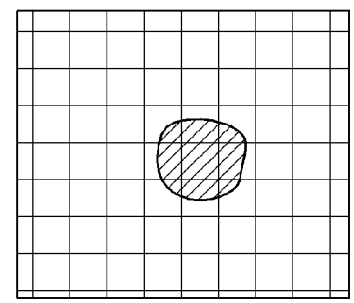

First, a step of detecting a first touch input is begun (ST100). The touch input detector 70 sends a position detection signal for all touch cells 60 in the above-described embodiment. If a user makes a touch input means 90 contact a touch panel 10, a virtual capacitor is formed between the touch input means 90 and a conductive pad 50 at a state where the touch input means 90 and the conductive pad 50 are spaced by a predetermined interval "d" from each other as shown in FIG. 9A. In addition, the touch input detector 70 detects a position detection signal via a second signal 34 by switching of a TFT 40, that is, detects an output waveform change in each touch cell 60 accurately.

Next, an area of a region where the first touch input has been detected is calculated (ST110). In this embodiment, an area calculator 80 adds the number of touch cells 60 where touch inputs have been detected, to thus calculate a touch input area. The number of the touch cells 60 where touch inputs have occurred in FIG. 9A is nine in total, and an area 51 about the first touch input is "tc*9".

Figure 9B:
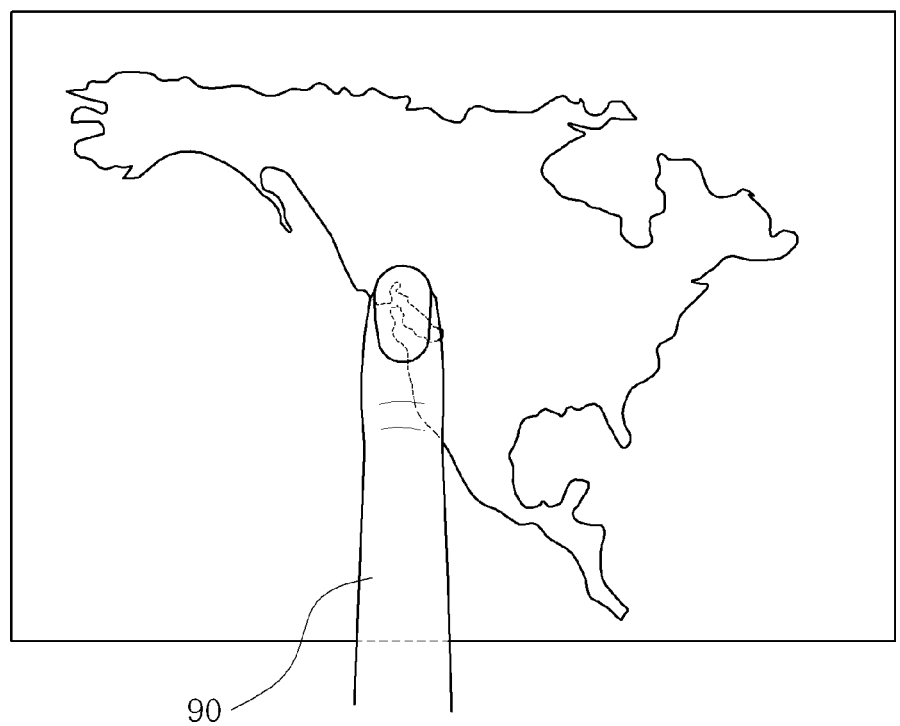

FIG. 9B shows a composition of a screen when a user performs a first touch input. The user touched a central part at a western coast on the map of the Northern America.

Figure 9C:
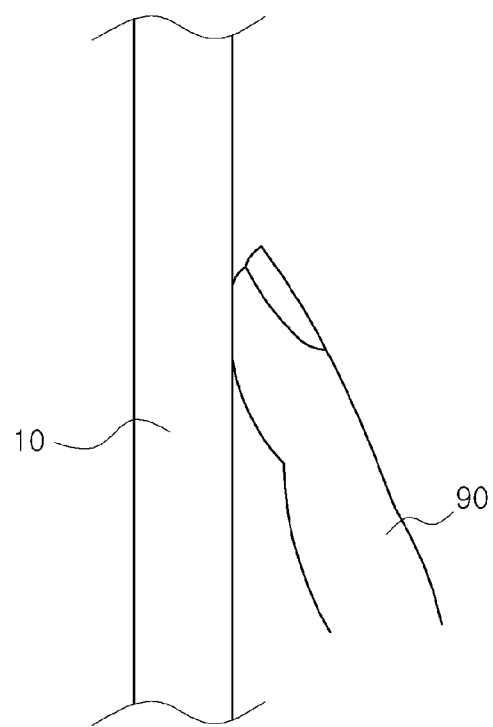
Figure 9C:
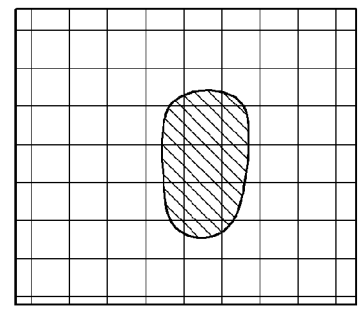

Next, a second touch input that occurs with a predetermined time interval is detected (ST120). Then, an area of a region where the second touch input has been detected is calculated (ST130). Here, it is assumed that a finger is laid down at a state where the user has kept the first touch input as shown in FIG. 9C. The number of touch cells 60 where touch inputs have occurred in FIG. 9C is fifteen in total, and a touch input area S2 detected for the second touch input is "tc*15."

At the next step, a change in the areas from the first touch input to the second touch input is judged (ST140). A zooming signal generator 85 compares signals S1 and S2 that are output from the area calculator 80, and produces a zooming signal according to an increase of the area and a decrease thereof. A zoom-in signal is produced if the area of S2 has increased than that of S1 (ST150). Meanwhile, a zoom-out signal is produced if the area of S2 has decreased than that of S1 (ST160). As described before, a zooming signal can be produced in contrary according to an increase or decrease of the touch input area. For example, when the area increases, a zoom-out signal is produced, and when the area decreases, a zoom-in signal can be produced.

Figure 9D:
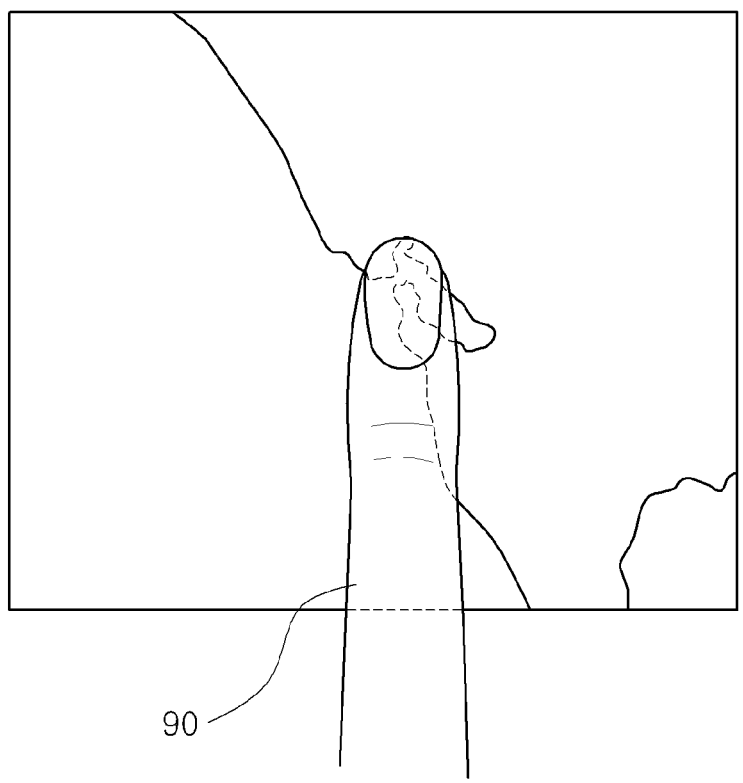

The second touch input area of FIG. 9C increased in comparison with the first touch input area of FIG. 9A in the illustrated embodiment. The zooming signal generator 85 produced a zoom-in signal in this embodiment, and an image is enlarged and displayed on the basis of the central point where the touch input has occurred as shown in FIG. 9D.

Figure 9E:
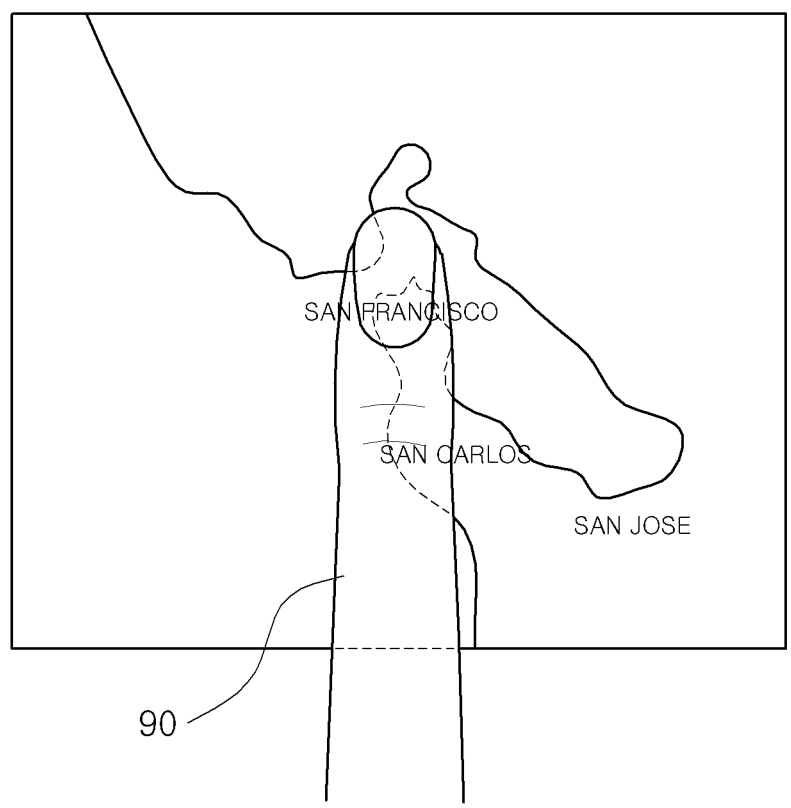

If the user lays down the finger more, the image is further enlarged after predetermined time has passed. As shown in FIG. 9E, the western coast of the Northern America is further enlarged and displayed.

Although it is not illustrated, if a user lifts the finger to reduce a contact area with respect to the touch panel in comparison with the first touch input on the FIG. 9E display screen, the zooming signal generator 85 will judge that the touch input area has been reduced in the step ST140. Then, the process of the touch input detection method goes to the step ST160, to accordingly make the image reduced and displayed on the display screen.

The aforenamed embodiments have been described with respect to an example of counting the number of the touch cells 60 where touch inputs have occurred, to thus calculate an area of the region where the touch inputs have been detected. By the way, if size of the unit touch cell 60 is bigger than an end area of a finger, the number of the touch cells 60 where touch inputs occur may not be changed even if a change in a contact area of the finger on the screen has occurred. In this case, it is difficult to count the number of the touch cells 60 to thus judge a change in the touch input area. An embodiment of judging a change in an area of a touch input in a method differing from the previously described embodiment will be described below.

Figure 10A:
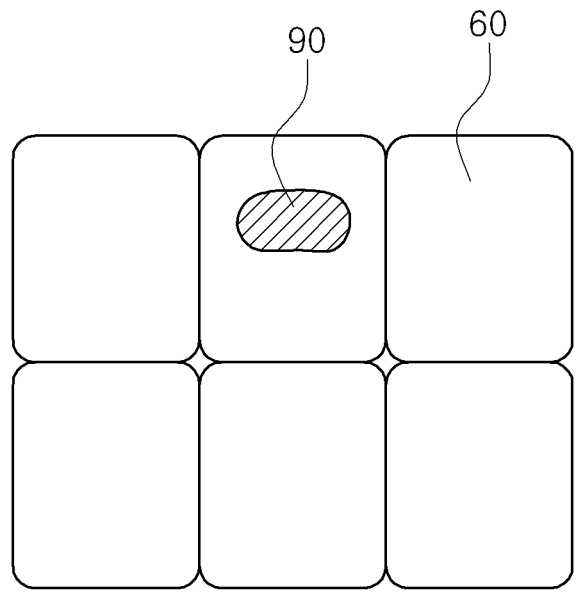
FIGS. 10A and 10B are diagrams showing other examples of touch inputs according to the present invention.
Figure 10B:
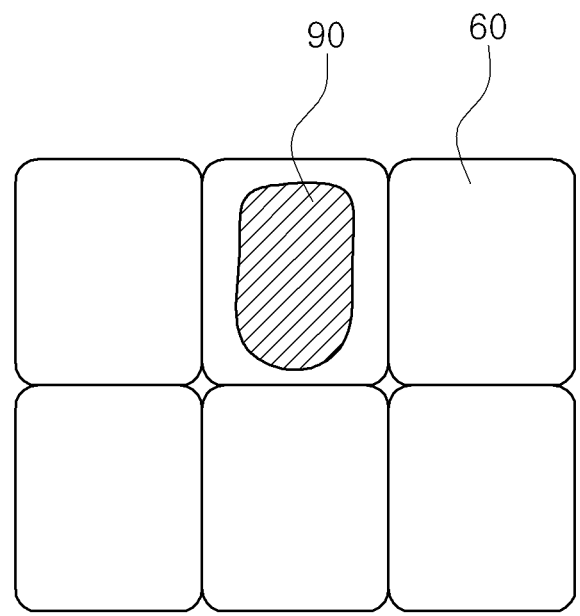

For example, in the case that size of the unit touch cell 60 is bigger than an end area of a finger as shown in FIGS. 10A and 10B, the end of the finger is made to contact the predetermined touch cell 60 as shown in FIG. 10A in order to generate a first touch input, and then the finger is laid down more as shown in FIG. 10B in order to generate a second touch input that widens a contact area of the finger on the display screen. However, the first and second touch inputs may be achieved in an identical touch cell 60.

In the above-described case, a change in the area of the unit touch cell 60 is detected, to thereby judge a change in the areas from the first touch input to the second touch input. For example, a change in electrostatic capacity that is formed between the touch input means 90 and the conductive pad 50 in the embodiments of FIGS. 2 through 7, to thereby judge a change in the areas from the first touch input to the second touch input.

Referring to FIG. 2, the conductive pad 50 and the touch input means 90 are positioned with an interval "d" spaced from each other and faced to each other with an opposing area, to accordingly form an electrostatic capacity of a formula that is illustrated on the right side of FIG. 2. If charges charged in the electrostatic capacity that is formed between the conductive pad 50 and the touch input means 90 are discharged through the first switching element 42 of FIG. 6, a discharge constant is proportional to an on-resistance (Rdson that is several mega ohms or so) and an electrostatic capacity value of the first switching element 42. Thus, if the on-resistance of the first switching element 42 is kept constant, magnitude of the electrostatic capacity becomes large as the opposing area between the touch input means 90 and the conductive pad 50 is wider. This means that the discharge constant increases.

Here, if time that is taken until voltage or electric current that is detected through the second signal line 34 reaches a given value is detected, or a voltage or electric current value is detected at certain time, the opposing area between the touch input means 90 and the conductive pad 50 can be calculated.

If a touch occurs and thus an electrostatic capacity is formed between the touch input means 90 and the conductive pad 50, duration time of electric current or magnitude of voltage input into the signal processor 73 through the second signal 34 becomes longer or larger than those of the touch cell 60 where no touch occurs. The magnitude of the detected duration time or voltage is processed by the signal processor 73, to thus discriminate whether or not a touch occurs so as to be stored in the memory unit 74. In the case that magnitude of the electric potential of each touch cell 60 is detected by a certain time interval, time that is taken until the electric potential or electric current not less than a reference value is detected becomes long as the opposing area between the touch input means 90 and the conductive pad 50 becomes wide. Therefore, a change in the magnitude of the electrostatic capacity is detected, to thereby calculate a change in the opposing area between the touch input means 90 and the conductive pad 50.

For example, when a second touch input is detected as shown in FIG. 10B in comparison with when a first touch input is detected as shown in FIG. 10A, time that is taken until the electric potential not less than a reference value is detected becomes long. This means an increase of a touch input area. Therefore, the zooming signal generator 85 judges an increase of a touch input area, and produces a zoom-in signal.

On the one hand, the zooming signal generator 85 is configured to judge a change in the areas from the first touch input to the second touch input and thus produces a zooming signal, only in the case that the first touch input and the second touch input occur continuously (not to be cut off) within predetermined time. A reason of detecting a change in the areas of the continuous touch inputs as described above is to distinguish zoom gestures from other touch inputs. If a zoom gesture is definitely distinguished from other touch inputs, a special process of entering the zoom gesture detection mode may be unnecessary, to thereby simplify an algorithm about the touch input detection and increase user convenience.

On the other hand, if a process of entering the zoom gesture detection mode exists separately, the zooming signal generator 85 may be configured to produce a zooming signal, even in the case that the first touch input and the second touch input have occurred intermittently.

In addition, the above embodiments have been described with respect to the cases of implementing a zoom gesture with only one finger, but the technological spirit or concept is not necessarily limited to the cases of implementing a zoom gesture with only one finger. For example, even in the case that a user executes a touch input with two fingers or more, a change in an area of the touch input is detected to thereby perform a zooming control. In the case that a zooming control is executed with two fingers, a change in the area of the total regions contacting the two fingers is judged to thus execute a zooming control. For example, in the case that the two fingers get wider, it is judged that the area of the regions that are located between the two fingers increases, to thus produce a zoom-in signal. Here, the central portion between the two fingers may become a zooming center.

As an alternative example, the central portion of expansion or reduction of an image is selected with one finger and a zooming control can be executed by a change in the area of a touch input with the other finger. As another alternative example, even in the case of contacting a touch pen, a change in a contact area is detected to thereby execute a zooming control.

As described above, the present invention has been described with respect to particularly preferred embodiments. However, the present invention is not limited to the above embodiments, and it is possible for one who has an ordinary skill in the art to make various modifications and variations, without departing off the spirit of the present invention. Thus, the protective scope of the present invention is not defined within the detailed description thereof but is defined by the claims to be described later and the technical spirit of the present invention.

The invention claimed is:

1. A touch input detection method that detects a contact or approach of a touch input means such as a finger of a human body, an electric conductor or a touch pen on a touch panel and produces an input signal, the touch input detection method comprising the steps of:
   (a) detecting a first touch input;
   (b) calculating an area where the first touch input has been detected;
   (c) detecting a second touch input that occurs at a predetermined time interval after occurrence of the first touch input;
   (d) calculating an area where the second touch input has been detected; and
   (e) calculating a change in the areas both within more than one touch cell and within one touch cell from the first touch input to the second touch input to thus produce a zooming signal,
   wherein the zooming signal that magnifies or reduces a screen on the basis of a central point of the area where the first touch input has occurred is produced,
   wherein the touch panel comprises a plurality of touch cells that detect a touch input individually are arranged in a matrix form,
   wherein each touch cell comprises at least one switching element for supply and interception of a position detection signal and a conductive pad that is connected to the gate terminal of the switching element, and
   wherein (a) detecting a first touch input and (c) detecting a second touch input is performed by detecting a signal that is generates due to charging and discharging of a virtual capacitor that is formed between the touch input means and the conductive pad to thus detect a touch input.

2. The touch input detection method of claim 1, wherein at the step (e), a zoom-in signal is produced when the area of the second touch input increases in comparison with that of the first touch input, and a zoom-out signal is produced when the area of the second touch input decreases in comparison with that of the first touch input.

3. The touch input detection method of claim 1, wherein at the step (e), a zoom-out signal is produced when the area of the second touch input increases in comparison with that of the first touch input, and a zoom-in signal is produced when the area of the second touch input decreases in comparison with that of the first touch input.

4. The touch input detection method of claim 1, wherein at the step (e), a change in the areas from the first touch input to the second touch input is calculated in the case that the first touch input and the second touch input continuously occur to thereby produce a zooming signal.

5. The touch input detection method of claim 1, wherein at the step (e), a change in the areas from the first touch input to the second touch input is calculated in the case that the first touch input and the second touch input intermittently occur to thereby produce a zooming signal.

6. The touch input detection method of claim 1, wherein the touch panel is a touch panel where a plurality of touch cells that detect a touch input individually are arranged in a matrix form, and calculation of the areas at the steps (b) and (d) is achieved by adding the number of the touch cells where the touch inputs have been detected.

7. The touch input detection method of claim 1, the calculation of the areas at the steps (b) and (d) is achieved by detecting magnitude of electrostatic capacity of the touch cells where the touch inputs have been detected.

8. A touch input detection device that detects a contact or approach of a touch input means such as a finger of a human body, an electric conductor or a touch pen on a touch panel and produces an input signal, the touch input detection device comprising:
   a touch input detector that detects a touch input when the touch input occurs on the touch panel;
   an area calculator that calculates an area of a corresponding touch input region at a point in place where the touch input has been detected when the touch input detector has detected the touch input; and
   a zooming signal generator that calculates a change in the area of the touch input both within more than one touch cell and within one touch cell that has been calculated in the area calculator according to lapse of time,
   wherein the zooming signal that magnifies or reduces a screen on the basis of a central point of the area where the first touch input out of the touch inputs involved in the change ratio in the size of the area has occurred is produced,
   wherein the touch panel is a touch panel where a plurality of touch cells are arranged in a matrix form,
   wherein each touch cell comprises at least one switching element for supply and interception of a position detection signal and a conductive pad that is connected to the gate terminal of the switching element, and wherein the touch input detector detects a signal that is generates due to charging and discharging of a virtual capacitor that is formed between the touch input means and the conductive pad to thus detect a touch input.

9. The touch input detection device as claimed in claim 8, wherein the zooming signal generator produces a zoom-in signal when the area of the touch input region increases according to lapse of time, and produces a zoom-out signal when the area of the touch input region decreases according to lapse of time.

10. The touch input detection device as claimed in claim 8, wherein the zooming signal generator produces a zoom-out signal when the area of the touch input region increases according to lapse of time, and produces a zoom-in signal when the area of the touch input region decreases according to lapse of time.

11. The touch input detection device as claimed in claim 8, wherein the touch panel is installed in the upper portion of a display device.

12. The touch input detection device as claimed in claim 8, wherein the touch panel is installed in a display device as any one substrate of substrates that are included in the display device.

13. The touch input detection device as claimed in claim 8, wherein the touch panel is a touch panel where a plurality of touch cells are arranged in a matrix form, and the area calculator calculates the area of the touch input region by adding the number of the touch cells where the touch inputs have been detected.

14. The touch input detection device as claimed in claim 8, wherein the area calculator detects magnitude of an electrostatic capacity of the touch cell where the touch input has been detected to thus calculate an area of the touch input region.

* * * * *